United States Patent
El-Kassouf

(10) Patent No.: US 6,691,839 B1
(45) Date of Patent: Feb. 17, 2004

(54) REDUCED DRAG WET DISC BRAKE

(75) Inventor: Raji S. El-Kassouf, Southfield, MI (US)

(73) Assignee: AxleTech International IP Holdings, LLC, Troy, MI (US)

( * ) Notice: Subject to any disclaimer, the term of this patent is extended or adjusted under 35 U.S.C. 154(b) by 217 days.

(21) Appl. No.: 09/356,431

(22) Filed: Jul. 19, 1999

(51) Int. Cl.⁷ .............................................. F16D 65/78
(52) U.S. Cl. ............................. 188/264 E; 188/267.1; 188/267.2; 482/903
(58) Field of Search ........................... 188/264 E, 71.6, 188/72.4, 71.5, 267, 267.1, 267.2, 155, 290; 482/903; 60/329

(56) References Cited

U.S. PATENT DOCUMENTS

| | | | |
|---|---|---|---|
| 2,661,596 A | * 12/1953 | Winslow | 60/329 |
| 2,661,825 A | * 12/1953 | Winslow | 192/21.5 |
| 2,663,809 A | * 12/1953 | Winslow | 310/78 |
| 4,432,440 A | 2/1984 | Crossman | 188/71.2 |
| 4,802,560 A | 2/1989 | Bhadra et al. | 188/264 F |
| 4,896,754 A | 1/1990 | Carlson et al. | 192/21.5 |
| 4,942,951 A | 7/1990 | Krieberegg et al. | 192/58 C |
| 5,197,583 A | 3/1993 | Sakai et al. | 192/35 |
| 5,207,305 A | * 5/1993 | Iverson | 188/264 E |
| 5,228,543 A | * 7/1993 | Heidenreich | 188/72.4 |
| 5,762,584 A | * 6/1998 | Daniels | 482/903 X |
| 5,816,372 A | * 10/1998 | Carlson et al. | 188/267.2 |
| 5,842,547 A | 12/1998 | Carlson et al. | 188/267 |
| 5,944,151 A | 8/1999 | Jakobs et al. | 188/267.1 |

FOREIGN PATENT DOCUMENTS

| | | |
|---|---|---|
| DE | 977197 | 6/1965 |
| DE | 19528457 | 2/1997 |
| EP | 0356145 | 2/1990 |
| EP | 0480175 | 4/1992 |
| JP | 9-163777 | * 6/1997 |

* cited by examiner

Primary Examiner—Pam Rodriguez
(74) Attorney, Agent, or Firm—Howard & Howard

(57) ABSTRACT

A reduced drag wet disc brake assembly is disclosed in which the viscosity of the fluid in the assembly is capable of changing. At higher traveling speeds, the viscosity of the fluid is low. However, when the viscosity of the fluid increases the speed of the vehicle decreases. The wet disc brake assembly comprises a brake cavity, a rotating plate disposed within the cavity that is rotatingly connected to the hub, two non-rotating plates disposed within the cavity on either side of the rotating plate, a current source connected to the rotating and non-rotating plates, and an electrorheological fluid filling the brake cavity. The viscosity of the electrorheological fluid changes depending on the electric current experienced by the fluid. In an alternative embodiment, the brake assembly also includes a coiled conductive wire connected to a current source to produce a magnetic field and the cavity is filled with magnetic rheological fluid instead of electrorheological fluid. The viscosity of the magnetic rheological fluid changes depending on the magnet field experienced by the fluid. Both embodiments can also include a piston that transmits a supplemental braking torque on the rotating plate to aid in decreasing the vehicle's speed.

15 Claims, 4 Drawing Sheets

REDUCED DRAG WET DISC BRAKE

BACKGROUND OF THE INVENTION

This invention generally relates to a reduced drag wet disc brake system and more particularly to a reduced drag wet disc brake system that uses a fluid with a viscosity that can be changed to achieve desired braking characteristics.

Braking systems in vehicles are used to reduce the speed of a moving vehicle or to bring the vehicle to a stop. To reduce the vehicle's speed or bring the vehicle to a stop, a force must be exerted to overcome the force of the engine and the inertia of the vehicle. Braking systems produce the needed force. Several types of known braking systems are used on vehicles, including, but not limited to, dry disc brakes and wet disc brakes.

A dry disc brake system for a single wheel on a vehicle essentially consists of a disc connected to and rotating with the axle hub that drives the vehicle's wheel, two brake pads and two pistons. One brake pad sits on each side of the rotating disc. Each piston sits adjacent to a brake pad on the side of the brake pad opposite the rotating disc. There is a similar system for each wheel on the vehicle.

A brake force is transmitted by hydraulic fluid forcing a piston to press against a brake pad. The brake pad then exerts a frictional force against the rotating disc causing the disc to decrease in rotational speed or stop rotating. One disadvantage of using dry disc brakes is frequent maintenance of the brake components.

Wet disc brake systems essentially have the same configuration as the dry disc brake system, except that there is a fluid contained within the brake housing that surrounds the rotating disc and the brake pads. Typically, hydraulic fluid is used to fill the brake housing.

Known wet disc brake systems are primarily used in low speed applications. The reason is due to the large drag force created by the fluid within the brake housing on the rotating disc. Therefore, the vehicle's engine must exert a large force to overcome the drag created by the fluid at higher traveling speeds. This results in an inefficient system at higher traveling speeds. However, wet disc brake systems have advantages over dry disc brake systems because the components in wet disc brakes encounter less wear than the components in dry disc brakes.

It would be advantageous to use a wet disc brake system on a vehicle in high-speed applications since that type of braking system experiences less wear.

SUMMARY OF THE INVENTION

In general terms, the disclosed wet disc brake assembly overcomes the above problem with standard wet disc brake assemblies. A reduced drag wet disc brake assembly is disclosed that can be efficiently used at low and high speeds.

The reduced drag wet disc brake assembly of the present invention includes a brake housing having a cavity that contains a fluid with a controlled viscosity. One appropriate fluid is an electrorheological fluid. Electrorheological fluids are fluids that change viscosity depending upon the electric current experienced by the fluid. The brake assembly further includes a hub rotatingly connected to the brake housing. A tire is connected to the hub. At least one rotating plate is disposed within the cavity and rotatingly connected to the hub. A plurality of non-rotating plates surround the rotating plate and are disposed within the cavity. The non-rotating plates are connected to the brake housing. A current source preferably applies a charge to the plurality of stationary plates and an opposed charge to the rotating plate.

When the electrorheological fluid within the cavity experiences no electric current, the fluid has a low viscosity. A fluid with a low viscosity flows easily. Therefore, the fluid produces a very low drag force on the rotating plate. On the other hand, when the fluid experiences an electric current, its viscosity increases. A fluid with a high viscosity has a high resistance to flow. Therefore, the fluid produces a higher drag force on the rotating plate.

Therefore, in the current invention, when the plates are not charged, the electrorheological fluid does not experience an electric current and therefore has a lower viscosity. A low drag force is thus exerted on the rotating plate by the electrorheological fluid. As a result, the wet disc brake assembly can be used in high-speed applications. When the plates become charged, the electrorheological fluid experiences an electric current and therefore, the viscosity of the fluid increases. The increased viscosity results in a larger drag force exerted on the rotating plate by the electrorheological fluid. The increased drag force causes the rotating plate to decrease in angular velocity. Since the rotating plate is connected to the hub, the hub mirrors the activity of the rotating plate and also decreases in rotational speed, resulting in a reduced vehicular speed or causing the vehicle to completely stop.

An alternative embodiment of the present invention has a slightly different configuration. A first difference is an additional coiled conductive wire that receives an electric current from the current source. A second difference is that the cavity is filled with a magnetic rheological fluid. Magnetic rheological fluids change viscosity depending upon the magnetic field experienced by the fluid. An electric current through the coiled wire creates a magnetic field.

When the magnetic theological fluid is not exposed to a magnetic field, the viscosity of the fluid is low. On the other hand, once the magnetic rheological fluid is exposed to a magnetic field, the viscosity increases. Similar to the preferred embodiment, a fluid with a high viscosity exerts a drag force on the rotating plate that causes the rotational speed of the rotating plate, and ultimately the hub, to decrease.

An additional feature of the brake assembly is a piston disposed within the cavity and adjacent the stationary and rotating plates. The piston provides a supplemental force. When an additional force is needed to reduce the speed of the vehicle, the piston is used to apply a normal load against the rotating plate to decrease the plate's angular velocity.

These and other features of the invention may be best understood from the following specification and drawings. The following is a brief description of the drawings.

DETAILED DESCRIPTION OF THE PREFERRED EMBODIMENT

Figure 1:
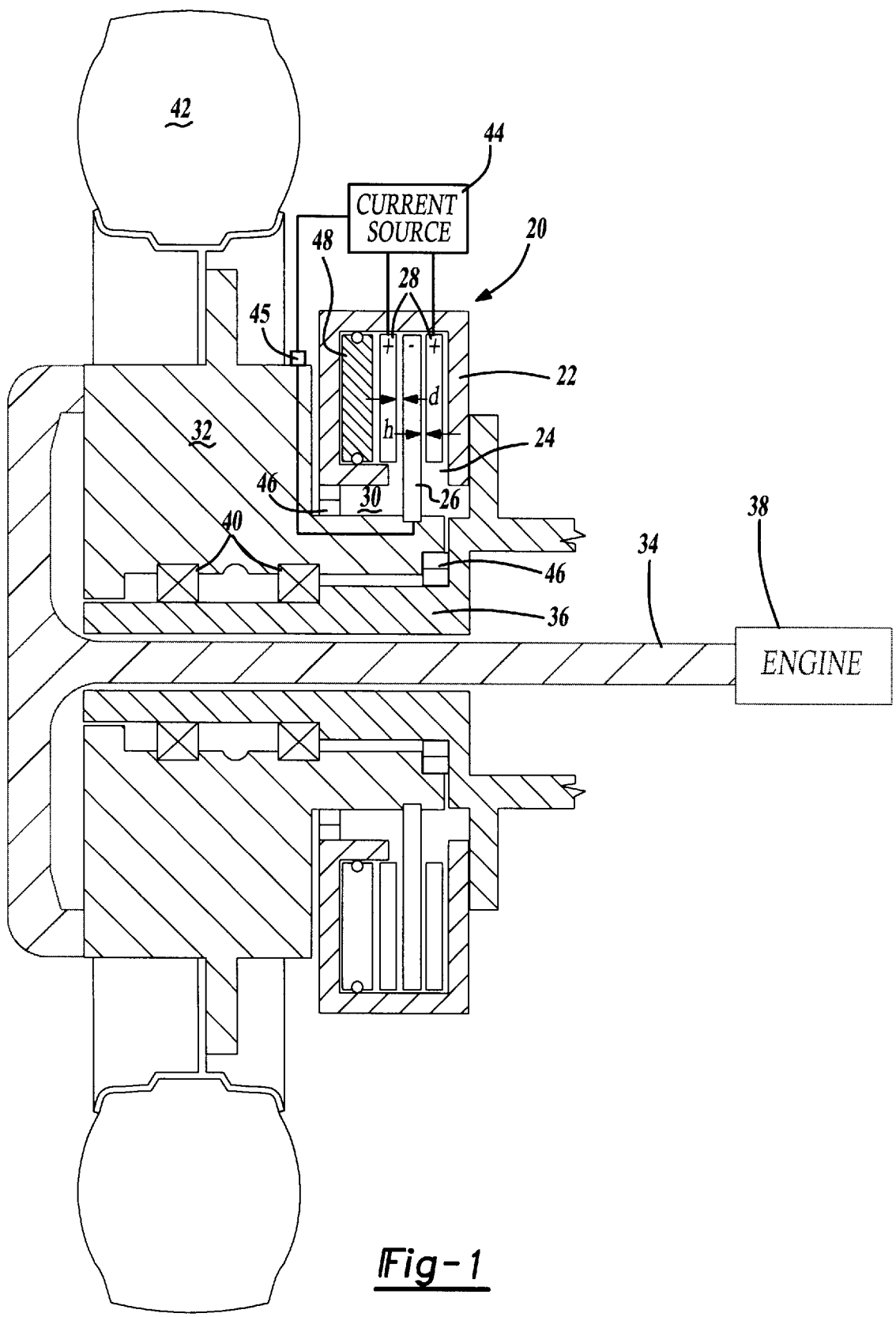
FIG. 1 is a schematic illustration of a system designed according to this invention.

FIG. 1 illustrates a reduced drag wet disc brake assembly, shown at 20. The brake assembly 20, preferably includes a brake housing 22 that defines a cavity 24, a rotating plate 26 and two non-rotating plates 28 disposed within the cavity 24, and electrorheological fluid 30 surrounding the plates 26, 28 and filling the cavity 24. The rotating plate 26 is connected to and rotates with a rotating hub 32.

As known, the vehicle's tire 42 is connected to and rotates with the hub 32. The hub 32 is connected to and rotates with an axle shaft 34 via bearings 40. However, no bearings are present if it is a non driving wheel. The axle shaft 34 is positioned within an axle housing 36 and is driven by the vehicle's engine 38. Therefore, the axle shaft 34, the hub 32, the rotating plate 26, and the tire 42 are all connected and when the vehicle 21 is moving all these components rotate simultaneously.

In order to reduce the speed of the moving vehicle 21, a force is applied to the rotating plate 26 to reduce its angular velocity. A reduction in the rotating plate's 26 angular velocity, has the effect of reducing the angular velocity of the hub 32 and the tire 42, therefore, reducing the speed of the vehicle 21.

The two non-rotating plates 28 are each connected to the brake housing 22 and positioned within the cavity 24. One non-rotating plate 28 is positioned on each side of the rotating plate 26. Further, the rotating plate 26 and the non-rotating plates 28 are each connected to an electric current source 44. The current source 44 preferably applies a positive charge to the non-rotating plates 28 and a negative charge to the rotating plate 26. Of course the charges could be reversed. Further, a known rotary electric connection 45 is used to transmit the electric current from the current source to the rotating plate.

The brake housing cavity 24 is filled with an electrorheological fluid 30 that surrounds both the rotating and non-rotating plates 26, 28 positioned within the cavity 24. The viscosity of an electrorheological fluid changes as the electric current through the fluid changes. The brake assembly 20 also preferably includes two seals 46, one at either opening of the cavity 24, to contain the electrorheological fluid 30 within the cavity 24.

When the electrorheological fluid 30 does not experience an electric current, the viscosity of the fluid remains low. A fluid with a low viscosity flows readily. On the other hand, when the fluid experiences an electric current, the viscosity of the fluid increases. A fluid with a high viscosity has a high resistance to flow.

When the vehicle 21 is traveling, the engine 38 drives the rotation of the hub 32 and tire 42. Since the rotating plate 26 is exposed to the fluid 30 in the cavity 24, the fluid 30 exerts a drag force on the rotating plate 26 when the plate 26 is rotating. The drag force exerted by the fluid 30 on the rotating plate 26 depends on the fluid's viscosity. The higher the viscosity of the fluid 30, the higher the drag force exerted on the rotating plate 26. A drag force experienced by the rotating plate 26 will decrease the rotating plate's angular velocity.

The use of an electrorheological fluid 30 in the reduced drag wet disc brake assembly 20 is advantageous because the viscosity of the fluid can be controlled. When the vehicle 21 is traveling at higher speeds, the viscosity of the electrorheological fluid 30 can remain low because no current is applied to the plates 26, 28, This translates into a low drag force exerted on the rotating plate 26 at higher speeds. When the vehicle 21 needs to decrease its speed or stop, an electric current is applied to the plates 26, 28, thus increasing the viscosity of the electrorheological fluid 30 in the cavity. The increased viscosity of the fluid 30 creates a larger drag force or braking torque that is applied to the rotating plate 26. Preferably the drag force exerted by the fluid 30 on the rotating plate 26 is great enough to significantly reduce the angular velocity of the rotating plate 26 which, in turn, results in a decrease in the vehicle's speed.

One additional component of the reduced drag wet disc brake assembly 20 is a piston 48 disposed within the brake housing cavity 24 that is positioned adjacent the non-rotating and rotating plates 28, 26. The piston 48 is available to provide a supplemental force on the rotating plate 26 to decrease the plate's angular velocity if needed to decrease the vehicle's speed. Preferably, when pressure is applied to the piston 48, the piston 48 is moved into contact with the non-rotating plate 28 adjacent the piston 48. The non-rotating plate 28 is then moved into contact with the rotating plate 26, thus creating a supplemental braking torque against the rotating plate 26 that causes the angular velocity of the rotating plate 26 to decrease. Since the rotating plate 26 is connected to the hub 32, the angular velocity of hub 32 also decreases, resulting in a decrease in:,the vehicle's speed.

Figure 2:
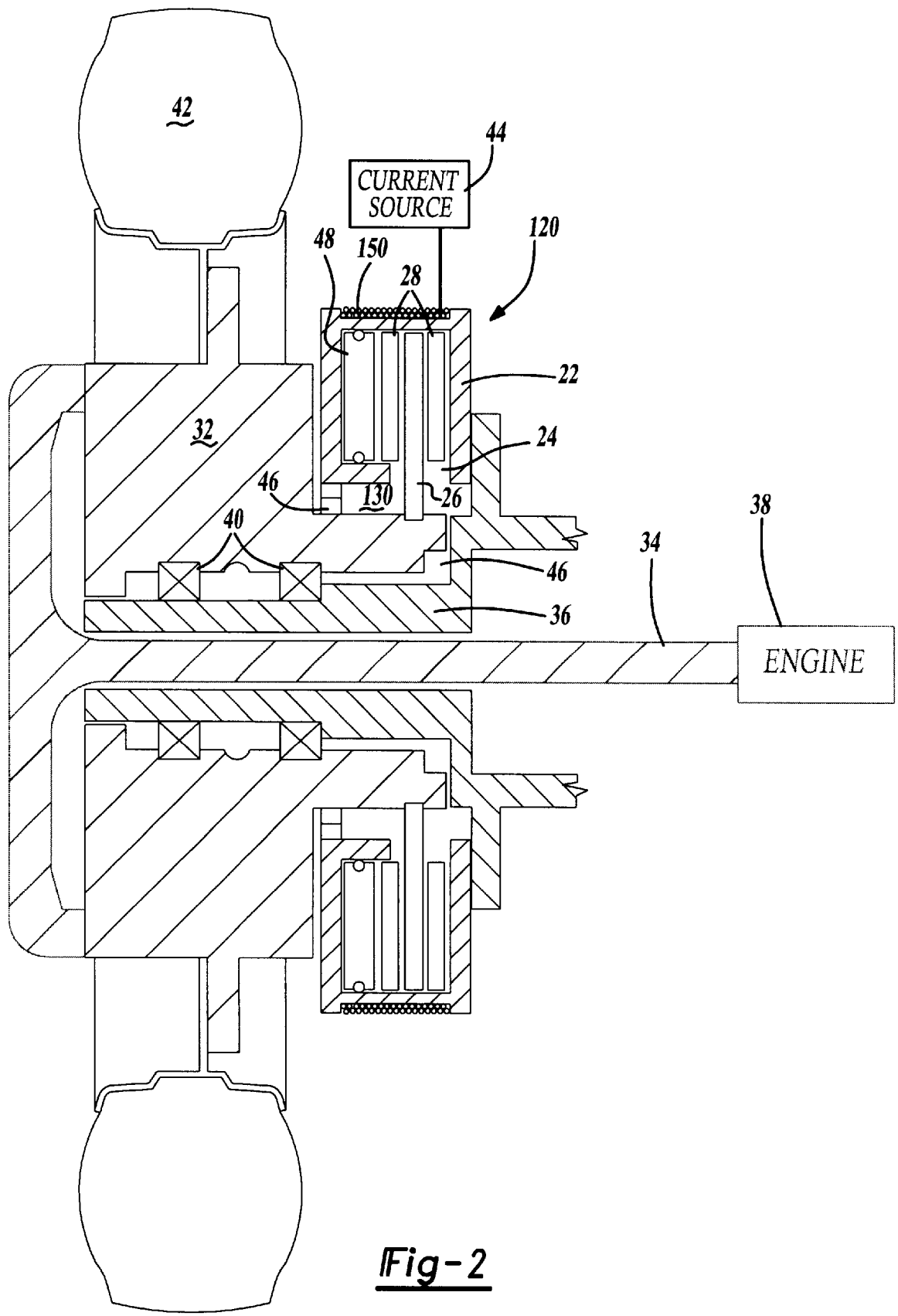
FIG. 2 is a schematic illustration of an alternative embodiment.

In an alternative embodiment, shown in FIG. 2, the fluid in the brake housing cavity 24 of the wet disc brake assembly 120 is a magnetic rheological fluid 130. The viscosity of a magnetic rheological fluid 130 changes when exposed to a magnetic field. An additional component in the alternative embodiment is a coiled wire 150 made of conductive metal. Applying an electric current to the coiled conductive wire 150 creates a magnetic field. The coiled wire 150 is positioned adjacent the brake housing 22.

Similar to the preferred embodiment, when the magnetic rheological fluid 130 does not experience a magnetic field, the viscosity of the fluid 130 remains low. A fluid with a low viscosity has a low resistance to flow, or rather, the fluid flows readily. On the other hand, when the fluid experiences a magnetic field, the viscosity of the fluid increases. A fluid with a high viscosity has a high resistance to flow.

When the vehicle 21 is traveling, the engine 38 drives the rotation of the hub 32 and tire 42. Since the rotating plate 26 is exposed to the fluid 130 in the cavity 24, the fluid 130 exerts a drag force on the rotating plate 26 when the plate 26 is rotating. The drag force exerted by the fluid 130 on the rotating plate 26 depends on the fluid's viscosity. The higher the viscosity of the fluid 130, the higher the drag force exerted on the rotating plate 26. A drag force experienced by the rotating plate 26 will decrease the rotating plate's angular velocity.

The use of a magnetic rheological fluid 130 in the reduced drag wet disc brake assembly 120 is advantageous because the viscosity of the fluid 130 can be controlled. When the vehicle 21 is traveling at higher speeds, the viscosity of the magnetic rheological fluid 130 can remain low because no current is applied to the coiled wire 150. This translates into a low drag force exerted on the rotating plate 26 at higher speeds. When the vehicle 21 needs to decrease its speed or stop, an electric current is applied to the coiled wire 150, thus increasing the viscosity of the magnetic theological fluid 150 in the cavity. The increased viscosity of the fluid 150 creates a larger drag force or braking torque that is applied to the rotating plate 26. Preferably the drag force exerted by the fluid 150 on the rotating plate 26 is great enough to significantly reduce the angular velocity of the rotating plate 26 which, in turn, results in a decrease in the vehicle's speed.

The alternative embodiment may also include a piston 48 disposed within the brake housing cavity 24 and positioned adjacent the non-rotating and rotating plates 28, 26. The piston 48 is available to provide a supplemental force on the rotating plate 26 to decrease the plate's angular velocity if needed to decrease the vehicle's speed. Preferably, when pressure is applied to the piston 48, the piston 48 is moved into contact with the non-rotating plate 28 adjacent the piston 48. The non-rotating plate 28 is then moved into contact with the rotating plate 26, thus creating a supplemental braking torque against the rotating plate 26 that causes the angular velocity of the rotating plate 26 to decrease. Since the rotating plate 26 is connected to the hub 32, the angular velocity of the hub 32 also decreases, resulting in a decrease in the vehicle's 21 speed.

While magnetic and electric theological fluids are disclosed, other fluids that have controllable viscosities may also be substituted.

Figure 3:
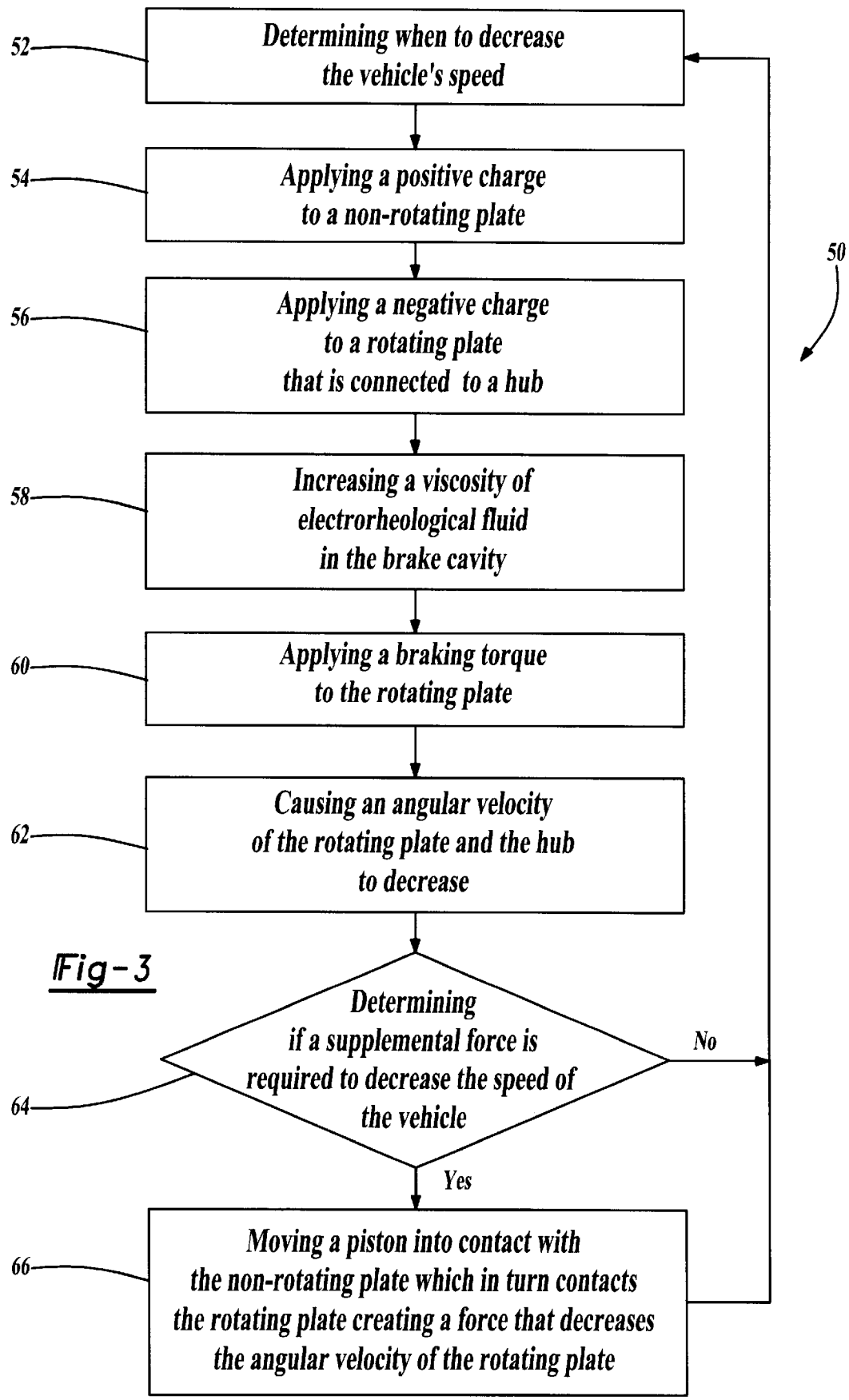
FIG. 3 is a flowchart diagram illustrating the preferred method of this invention.

FIG. 3 schematically illustrates the preferred method of operating the system 20. The flow chart 50 includes a first step at 52 where a determination is made to decrease the vehicle's 21 speed. If the speed of the vehicle 21 should be reduced, a positive charge is applied to a non-rotating plate 28 at 54 and a negative charge is applied to a rotating plate 26 at 56. At 58 the viscosity of the electrorheological fluid 30 in the brake cavity 24 increases due to the electric current experienced by the electrorheological fluid 30. The increased viscosity causes an increased drag force on the rotating plate 26. A braking torque, as a result of the increased drag, is applied to the rotating plate 26 at 60. At 62 the angular velocity of the rotating plate 26 and the hub 32 decrease due to the applied braking torque. A determination is made at 64 whether a supplemental force is required to decrease the speed of the vehicle 21. If a supplemental force is required, at 66 a piston 48 is moved into contact with the non-rotating plate 28 which in turn contacts the rotating plate 26 creating a force that decreases the angular velocity of the rotating plate 26. As can be appreciated from the flow chart 50, the system preferably continuously monitors the vehicle's speed.

Figure 4:
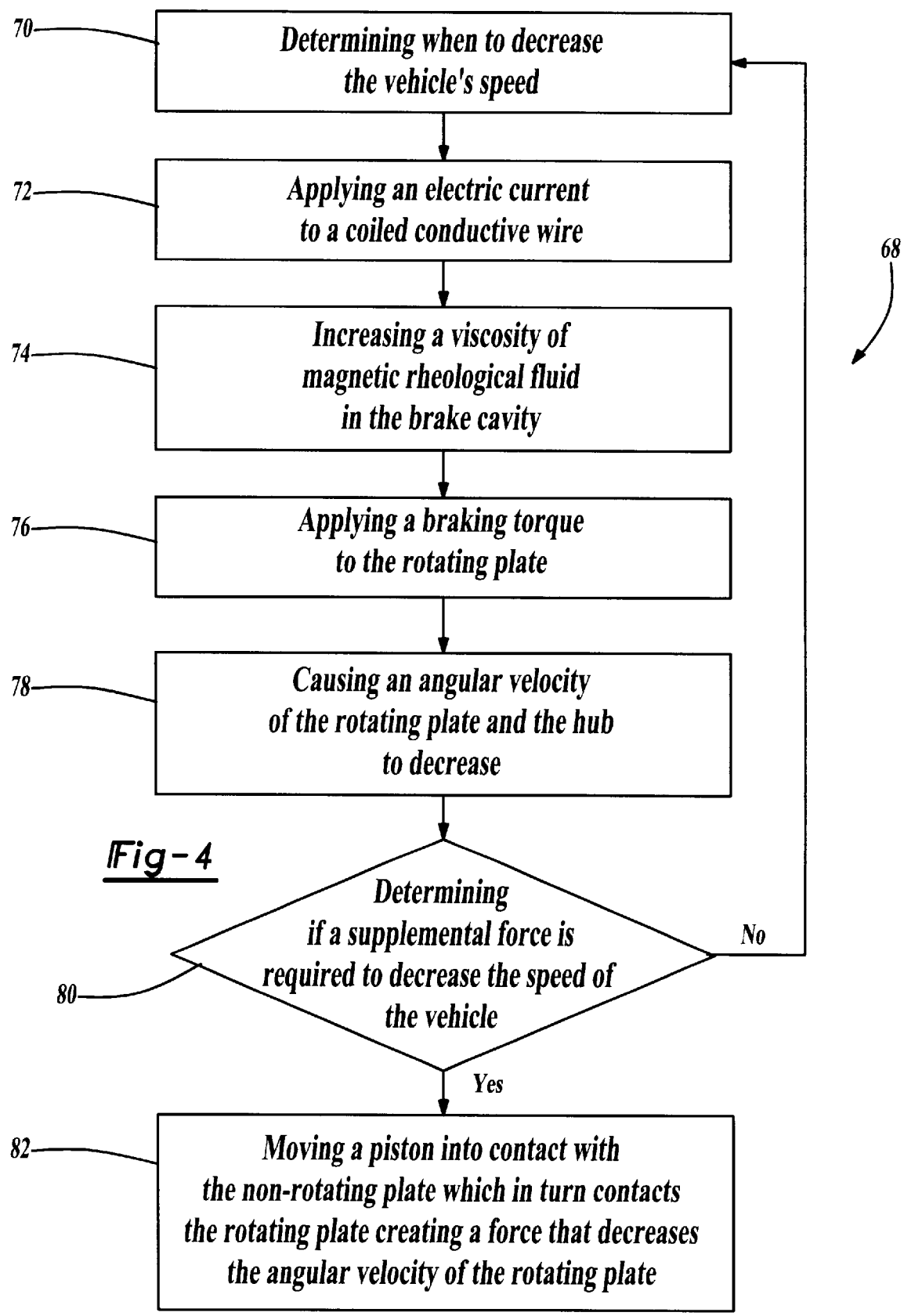
FIG. 4 is a flowchart diagram illustrating an alternative method of the invention.

FIG. 4 schematically illustrates an alternative method of operating the system 20. The flow chart 68 includes a first step at 70 where a determination is made to decrease the vehicle's 21 speed. If the speed of the vehicle 21 should be reduced, an-electric current is applied to a coiled conductive wire 150 at 72 creating a magnetic field. At 74 the viscosity of the magnetic rheological fluid 130 in the brake cavity 24 increases due to the magnetic field experienced by the magnetic rheological fluid 130. The increased viscosity causes an increased drag force on the rotating plate 26. A braking torque as a result of the increased drag is applied to the rotating plate 26 at 76. At 78 the angular velocity of the rotating plate 26 and the hub 32 decrease due to the applied braking torque. A determination is made at 80 whether a supplemental force is required to decrease the speed of the vehicle 21. If a supplemental force is required, at 82 a piston 48 is moved into contact with the non-rotating 28 plate which in turn contacts the rotating plate 26 creating a force that decreases the angular velocity of the rotating plate 26. As can be appreciated from the flow chart 68, the system preferably continuously monitors the vehicle's speed.

The invention has been described in an illustrative manner, and it is to be understood that the terminology that has been used is intended to be in the nature of words of description rather than of limitation. Modifications and variations of the examples described above are possible and it must be understood that such changes may be within the scope of the following claims. In other words, the invention may be practiced otherwise than as specifically described above.

What is claimed is:

1. A wet disc brake assembly comprising:
   a housing defining a cavity;
   at least one non-rotating plate slidably connected to said housing and disposed within said cavity;
   a hub supported for rotation relative to said housing;
   at least one rotating plate slidably connected to said hub and disposed with said cavity adjacent said at least one non-rotating plate with said rotating plate rotating in conjunction with said hub;
   a fluid disposed within said cavity to at least partially surround said rotating and non-rotating plates with said fluid having a viscosity that varies under application of an electrical current;
   an actuator movably mounted to said housing within said cavity and selectively abutting one of said plates with said actuator moving axially toward said rotating and non-rotating plates to move and compress said plates together for increasing a drag force experienced by said plates and said actuator moving axially away from said rotating and non-rotating plates to allow said plates to move apart from each other for decreasing a drag force experienced by said plates; and
   a current source selectively applying an electrical current to vary said viscosity of said fluid whereby generation of said electrical current increases and viscosity of said fluid for increasing said drag force experienced by said plates and an absence of said electrical current results in a low viscosity of said fluid for decreasing said drag force experienced by said plates such that said rotational speed of said hub can be electronically controlled.

2. The wet disc brake assembly of claim 1, wherein said current source applies a charge to said at least one non-rotating plate and said current source applies an opposed charge to said at least one rotating plate, and said fluid is an electrorheological fluid.

3. The wet disc brake assembly of claim 2, wherein said at least one non-rotating plate includes two non-rotating plates with one rotating plate disposed between said two non-rotating plates.

4. The wet disc brake assembly of claim 2, wherein said viscosity of said electrorheological fluid changes when said plates are charged.

5. The wet disc brake assembly of claim 4, wherein said current source applies a positive charge to one of said non-rotating and rotating plates and said current source applies a negative charge to the other of said non-rotating and rotating plates to generate said electrical current within said fluid to vary said viscosity.

6. The wet disc brake assembly of claim 5, wherein said current source applies a positive charge to said non-rotating plate and a negative charge to said rotating plate to generate said electrical current.

7. The wet disc brake assembly of claim 1, wherein said actuator is further defined as a piston disposed within said cavity adjacent one of said non-rotating and rotating plates.

8. The wet disc brake assembly of claim 7, wherein said piston abuts said non-rotating plate and axially moves said non-rotating plate toward said rotating plate for increasing a drag force experienced by said rotating plate that causes an angular velocity of said rotating plate to decrease which also decreases an angular velocity of said hub.

9. The wet disc brake assembly of claim 8, wherein said piston axially moves said plates together simultaneously with said current source applying said electrical current.

10. The wet disc brake assembly of claim 1, further comprising two seals to contain said fluid within said cavity.

11. The wet disc brake assembly of claim 1, wherein said fluid is magnetic rheological fluid.

12. The wet disc brake assembly of claim 11, further comprising a coil connected to said current source, wherein a magnetic field is produced when said coil receives an electric current.

13. The wet disc brake assembly of claim 1, further including a plurality of non-rotating plates interspersed within a plurality of rotating plates.

14. The wet disc brake assembly of claim 1, further including a non-rotatable spindle with said housing fixed to said spindle and said hub rotatably mounted to said spindle.

15. The wet disc brake assembly of claim 1, wherein said actuator axially moves said plates together simultaneously with said current source applying said electrical current.

* * * * *

UNITED STATES PATENT AND TRADEMARK OFFICE
CERTIFICATE OF CORRECTION

PATENT NO. : 6,691,839 B1
DATED : February 17, 2004
INVENTOR(S) : Raji S. El-Kassouf It is certified that error appears in the above-identified patent and that said Letters Patent is hereby corrected as shown below:

Column 6,
Line 27, delete "and" replace it with -- said --.

Signed and Sealed this

Twenty-fifth Day of May, 2004

JON W. DUDAS
*Acting Director of the United States Patent and Trademark Office*